United States Patent [19]
Smith

[11] Patent Number: 5,533,410
[45] Date of Patent: Jul. 9, 1996

[54] MOTOR POWER MEASURING CELL FOR MOTOR OPERATED VALVES

[75] Inventor: Christopher P. Smith, Acworth, Ga.

[73] Assignee: Westinghouse Electric Corporation, Pittsburgh, Pa.

[21] Appl. No.: 161,036

[22] Filed: Dec. 3, 1993

[51] Int. Cl.[6] ........................................ G01L 3/02
[52] U.S. Cl. ........................... 73/862.193; 73/168
[58] Field of Search ........................ 73/168, 862.193

[56] References Cited

U.S. PATENT DOCUMENTS

| | | | |
|---|---|---|---|
| 4,135,101 | 1/1979 | Charbonneau et al. | 73/862.193 |
| 4,408,144 | 10/1983 | Lukes | 318/7 |
| 4,542,649 | 9/1985 | Charbonneau et al. | 73/168 |
| 4,690,003 | 9/1987 | McNemamy et al. | 73/862.193 |
| 4,787,245 | 11/1988 | Anderson et al. | 73/168 |
| 4,831,873 | 6/1989 | Charbonneau et al. | 73/168 |
| 4,869,102 | 7/1989 | Charbonneau et al. | 73/168 |
| 4,882,937 | 11/1989 | Leon | 73/862.628 |
| 4,888,996 | 12/1989 | Rak et al. | 73/862 |
| 4,891,975 | 1/1990 | Charbonneau et al. | 73/168 |
| 5,000,040 | 3/1991 | Charbonneau et al. | 74/168 |
| 5,172,774 | 12/1992 | Melrose | 81/469 X |

Primary Examiner—Richard Chilcot
Assistant Examiner—Elizabeth L. Dougherty
Attorney, Agent, or Firm—D. G. Maire

[57] ABSTRACT

Disclosed is apparatus and a system for measuring and monitoring the actual mechanical power being produced by an electric motor and measuring and monitoring the reactive torque acting on and the rotational speed of a drive shaft of the electric motor used to drive a valve actuator of a motor operated valve (MOV). The apparatus and system is comprised of a motor power measuring cell inserted between and bolted to the electric motor housing and to the valve actuator housing of commercial MOVs to provide continuous in-service valve and motor diagnostics. The motor power measuring cell is provided with a first measuring means for measuring the torque acting on the drive shaft and a second measuring means for measuring the rotational speed of the drive shaft.

15 Claims, 5 Drawing Sheets

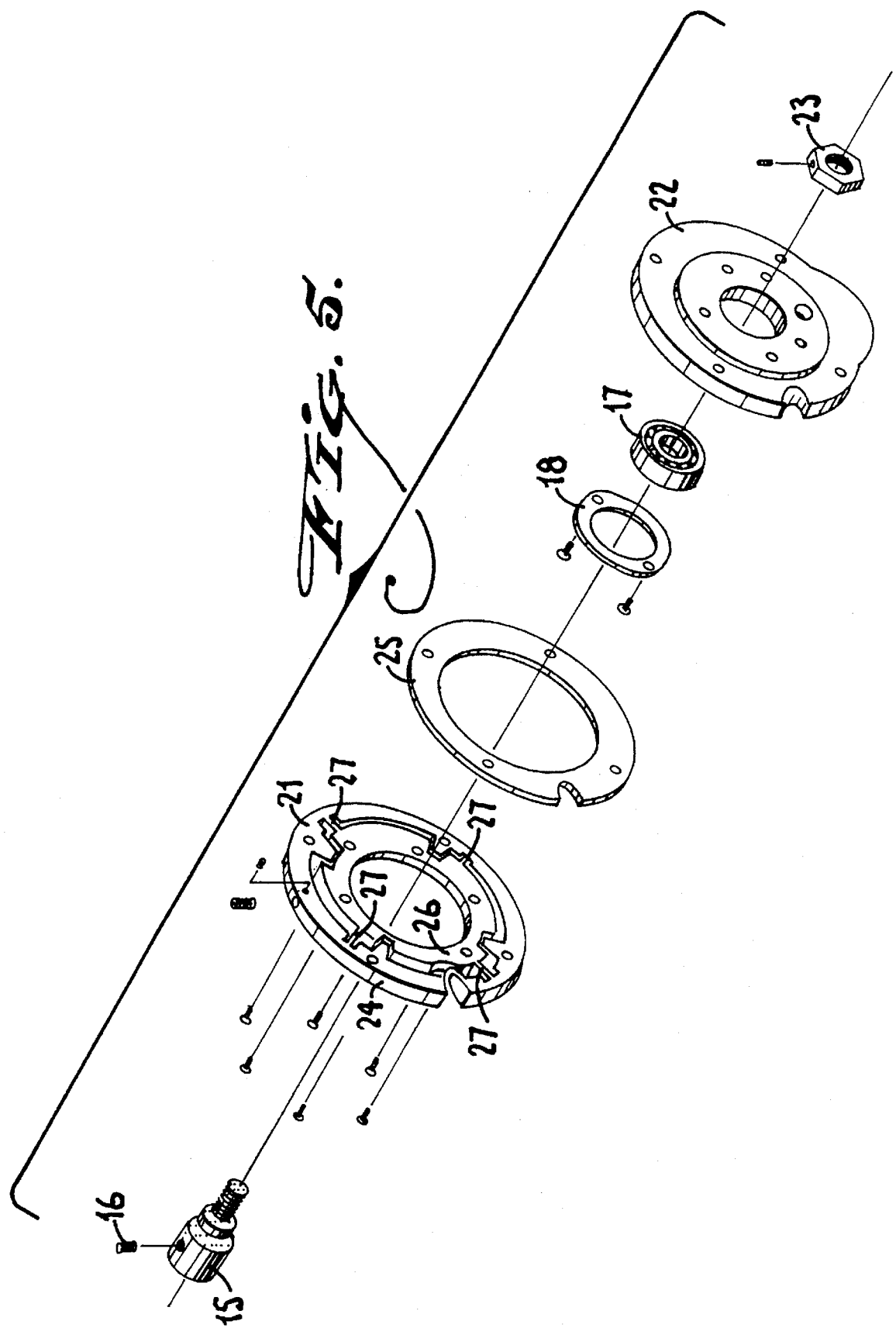

MOTOR POWER MEASURING CELL FOR MOTOR OPERATED VALVES

BACKGROUND OF THE INVENTION

This invention relates to apparatus for measuring the actual mechanical power being produced by an electric motor and measuring and monitoring the amount of reactive torque acting on the drive shaft of the electric motor and the rotational speed of the drive shaft. It relates more particularly to a motor power measuring cell useful in measuring and monitoring the actual mechanical power produced by an electric motor and the amount of reactive torque acting upon the drive shaft and the rotational speed of the drive shaft of the electric motor used to actuate a motor operated valve. This invention is especially useful in the field of valve diagnostics.

In the nuclear power industry, valves are actuated remotely by electric motors to open, closed or intermediate positions to improve or maintain power plant output and to maintain proper cooling of the nuclear reactor. Continuous and proper operation of the valves is essential for reliable operation of the power plant and the safety of the general public. Both the power industry and the valve industry have had a need to develop apparatus and systems to continuously measure, test and monitor various operating parameters associated with valves, especially remote motor operated valves, and to alert the power plant operator of any significant changes in any of the operating parameters being measured, tested and monitored.

U.S. Pat. No. 4,542,649 to Charbonneau et al. discloses a recently developed motor operated valve monitoring system that measures, records and correlates a number of valve operating parameters, such as valve stem load, valve stem movements, valve stem torque, spring pack movement and motor current. The information provided by the system described in the Charbonneau et al. patent provides a direct indication to the operator of any valve problems, such as excessive or inadequate packing loads, excessive inertia, incorrectly set limit and torque switches, malfunctioning thermal overload devices, excessive stem thrust loads, gear train wear and damage to the valve stem.

As a result of the teachings of the Charbonneau et al. patent, efforts have been made by ITI Movats, Inc., the assignee of the Charbonneau et al. patent, as well as the assignee of the present patent application, to develop additional apparatus and systems by which the operation and performance of motor operated valves could be easily measured, tested and monitored by an operator at a location remote from the valve. Several such systems have been developed for monitoring AC motor operated valves by measuring and monitoring electrical power parameters of the AC motor during its operation and are described in U.S. Pat. Nos. 4,787,245; 4,831,873; 4,869,102; 4,891,975 and 5,000,040 assigned to Movats, Inc. Another system has been developed for monitoring DC motor electrical power parameters for DC motor operated valves and is described in U.S. Pat. No. 4,888,996 assigned to ITI Movats Inc. This system measures and monitors motor armature current, voltage drop across the armature and the electrical resistance of the armature and uses the measurements to calculate output power of the motor, armature speed and a motor torque factor representative of the motor output torque multiplied by a constant. There has been a need to develop apparatus and systems to continuously and directly measure and monitor the actual mechanical power being produced by an electric motor by continuously and directly measuring both the rotational speed and the total reactive torque acting on the drive shaft of the electric motor used to operate a motor operated valve (MOV), while the valve is in service. Prior to this invention, such continuous and direct mechanical drive shaft rotational speed and total reactive torque measurements have not been possible with commercial MOVs since the electric motor is sealed in a housing that is fastened directly to the sealed housing of the valve actuator. The commercial MOVs do not normally have an exposed drive shaft or other means to attach the sensors needed to mechanically measure the rotational speed or total reactive torque acting on the drive shaft.

The rotational speed and torque supplied by the drive shaft of a motor could be measured by removing the motor from the MOV assembly and testing the motor in a test stand but this type of bench test does not provide measurements or information concerning the actual mechanical power of the motor or the actual rotational speed or reactive torque acting on the motor drive shaft at all times while the motor operated valve is actually in service.

SUMMARY OF THE INVENTION

It is therefore an object of this invention to provide apparatus and a system to continuously and directly measure and monitor actual mechanical power and the rotational speed and the reactive torque acting on the drive shaft of an electric motor being used to operate a motor operated valve.

It is another object of this invention to provide apparatus and a system to continuously and directly measure and monitor actual mechanical power and the rotational speed and the reactive torque acting on the drive shaft of an electric motor being used to operate a motor operated valve that is simple, inexpensive and capable of being easily installed on most commercial motor operated valves, without major modifications to the valve assembly.

It is still another object of this invention to provide apparatus and a system to continuously and directly measure and monitor actual mechanical power and the rotational speed and reactive torque acting on the drive shaft of an electric motor being used to operate a motor operated valve that is reliable and will provide continuous and direct rotational speed and reactive torque measurements to a remote location over an extended period of time with no or little maintenance. It has been discovered that the foregoing objects can be attained by apparatus and a system for continuously and directly measuring the actual mechanical power and the rotational speed and reactive torque acting on the drive shaft of an electric motor being used to drive a valve actuator assembly comprising a motor power measuring cell secured to and positioned between the electric motor housing and the valve actuator assembly housing. The motor power measuring cell is provided with a first measuring means for measuring the reactive torque acting on the drive shaft and a second measuring means for measuring the rotational speed of the drive shaft.

BRIEF DESCRIPTION OF THE DRAWINGS

FIG. 5 is an "exploded" view, illustrating the components of one embodiment of the motor power measuring cell of this invention.

FIG. 6 is an enlarged view of the portion of the torque sensor ring contained within the circled area marked VI shown on FIG. 5a.

DESCRIPTION OF THE PREFERRED EMBODIMENT

Figure 2:
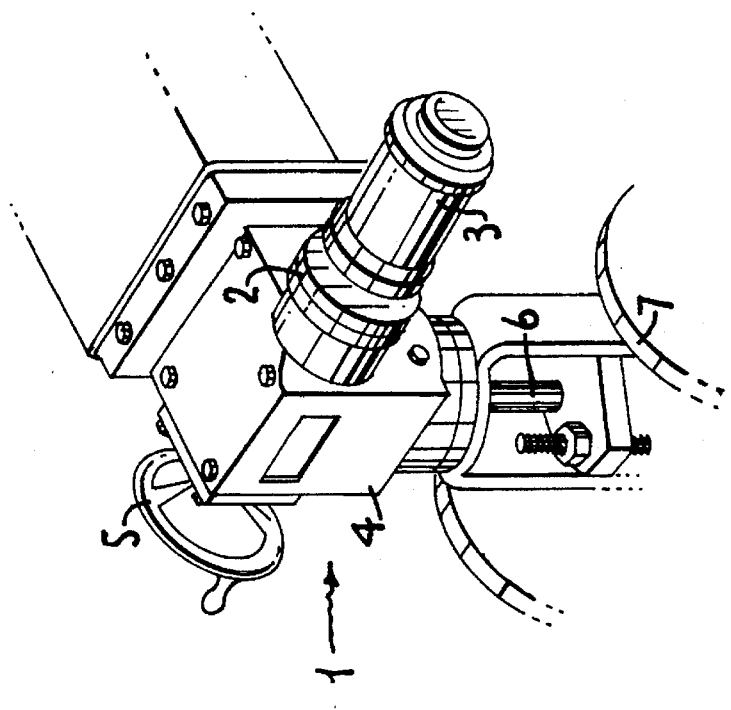
FIG. 2 is an isometric view of a typical motor operated valve (MOV), fitted with the motor power measuring cell of this invention.
Figure 1:
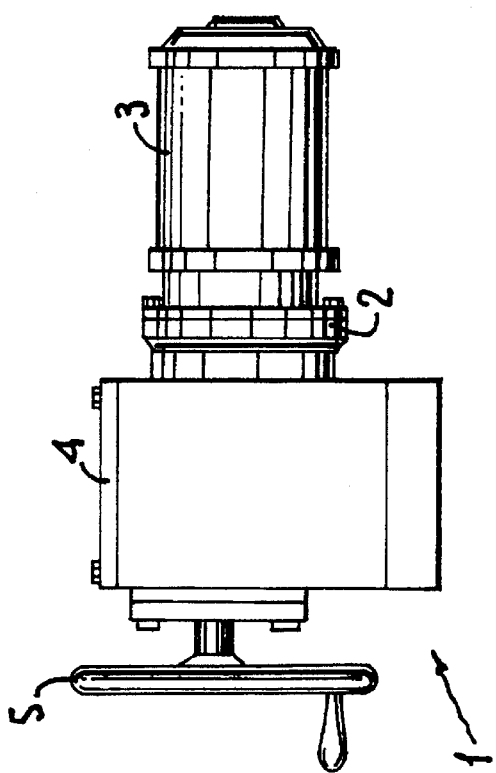
FIG. 1 is a side elevation view of a typical motor operated valve (MOV), fitted with the motor power measuring cell of this invention.

FIG. 1 is a side elevation view of a typical motor operated valve (MOV) 1, fitted with the motor power measuring cell 2 of this invention. FIG. 2 is an isometric view of a typical motor operated valve (MOV) 1, fitted with the motor power measuring cell 2 of this invention. As shown in FIGS. 1 and 2, the MOV illustrated is typical of commercial MOVs used in the valve industry, such as the Models "SMB", "SB" and "SBD" MOVs sold by Limitorque Corporation. The MOV, according to this invention, is comprised generally of an electric drive motor capable of producing a very high starting torque contained in a sealed motor housing 3, attached to one face of a motor power measuring cell insert 2. The opposite face of the motor power measuring cell insert 2 is attached one side of the MOV actuator housing 40 The other side of the MOV actuator housing 4 is usually provided with a hand wheel 5. The MOV actuator housing 4 contains the MOV actuator mechanism comprising a motor driven wormshaft that drives a worm and worm gear, a sleeve and an internally threaded drive nut attached to the worm gear which engage an externally threaded valve stem 6. The valve stem 6 is moved axially by the MOV actuator assembly to open or close the valve element in the valve body 7.

Figure 3:
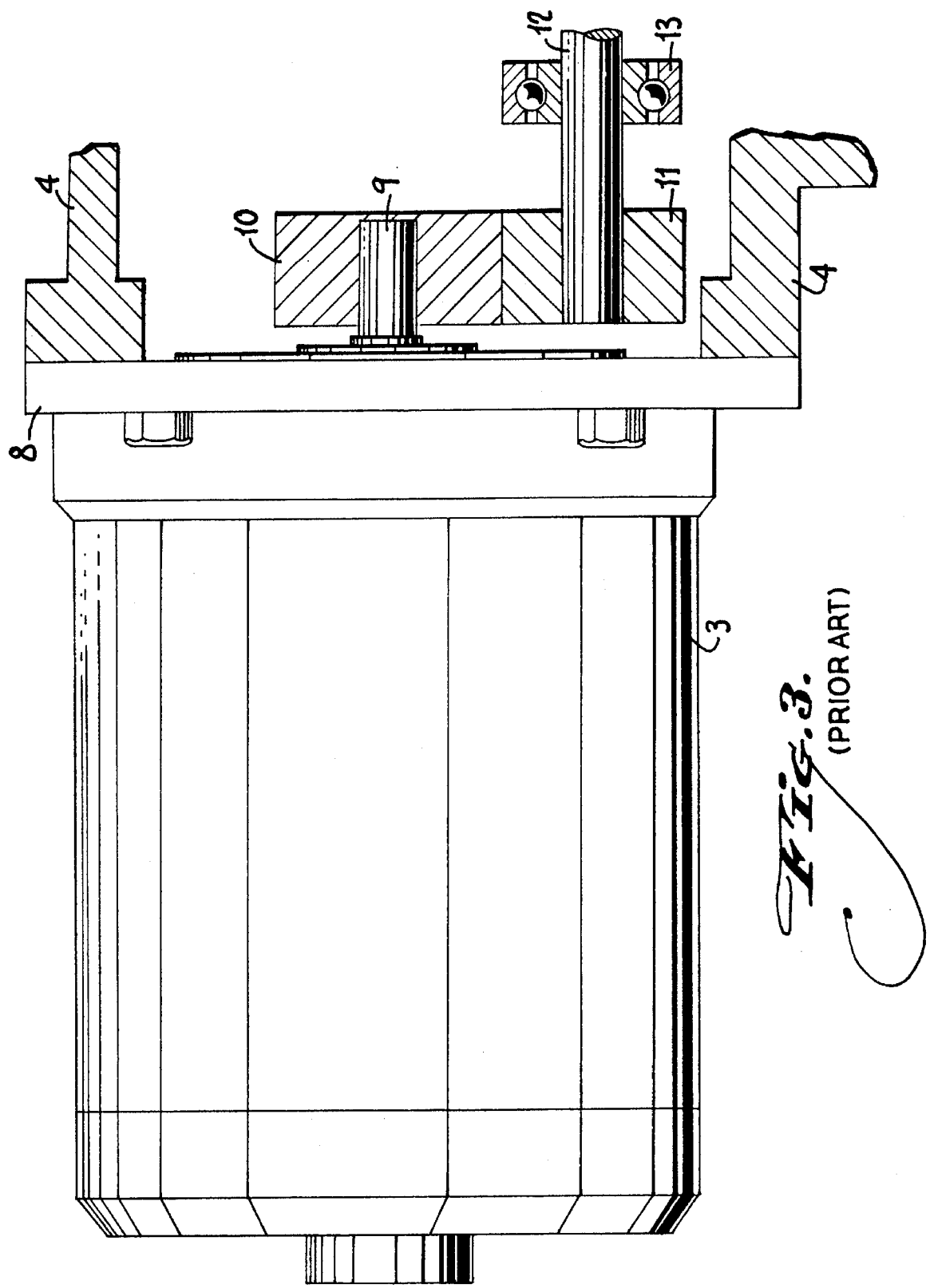
FIG. 3 is side view, partly in section, illustrating a typical prior art electric motor/valve actuator assembly interface used on commercial motor operated valves (MOV), prior to this invention.

FIG. 3, is a side view, partly in section, of a typical prior art MOV 1 illustrating the typical interface between the electric drive motor housing 3 and the MOV actuator assembly housing 4 prior to this invention. As shown in FIG. 3, the electric drive motor housing 3 has a flange 8 which is bolted to one side of the MOV actuator assembly housing 4. The drive shaft 9 of the electric motor sealed within the motor housing 3 is fitted with a motor pinion gear 10 which engages and drives a wormshaft gear 11 attached to one end of a wormshaft 12 rotatably supported by a bearing assembly 13. The wormshaft 12 drives a worm and worm gear (not shown) that actuate or drive the valve stem 6 and the valve element of the valve body 7, as described earlier.

Figure 4:
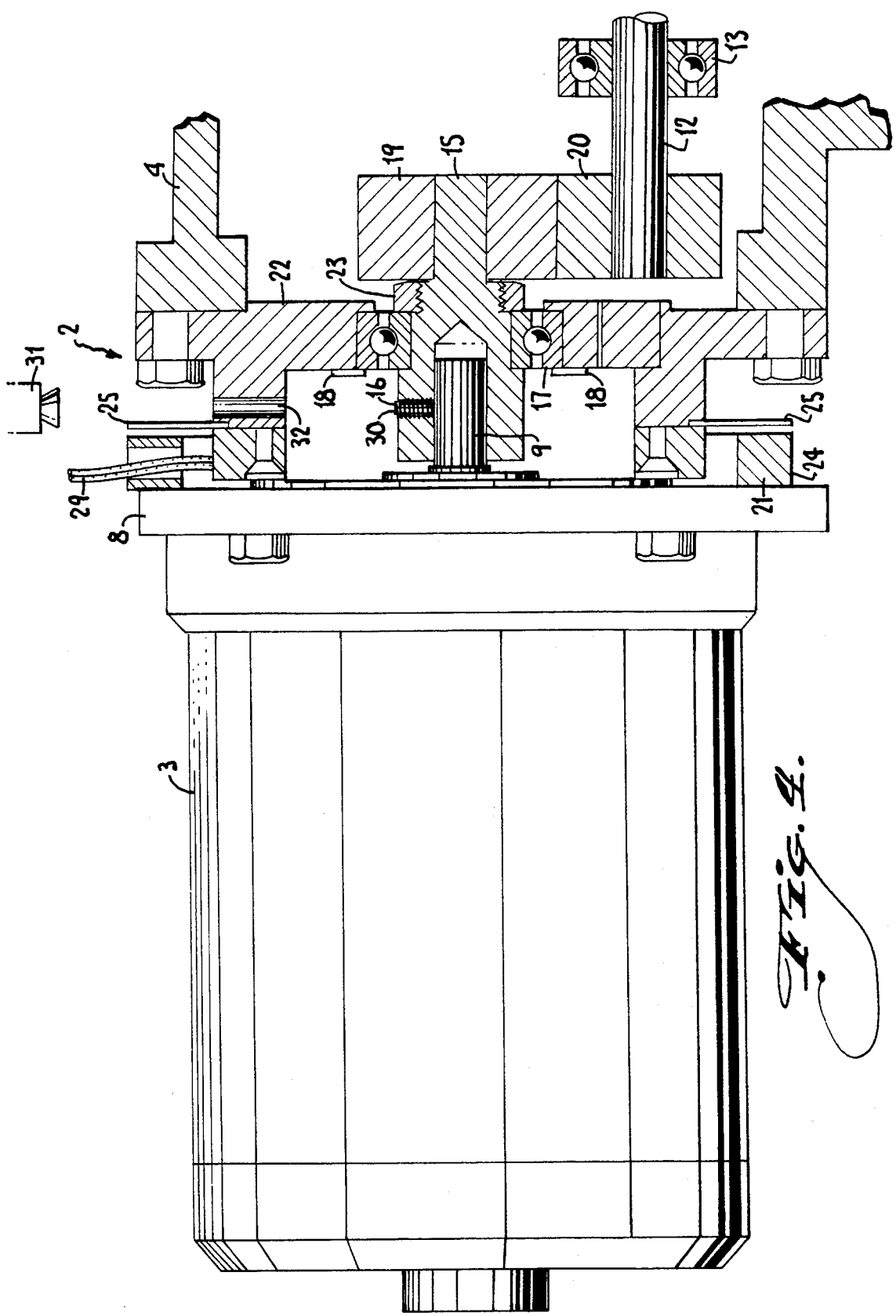
FIG. 4 is a side view, partly in section, illustrating the electric motor/valve actuator assembly interface of a motor operated valve (MOV) fitted with the motor power measuring cell of this invention.

FIG. 4, is side view, partly in section, somewhat similar to FIG. 3, illustrating the motor power measuring cell 2 of this invention fitted as an insert between the electric drive motor housing 3 and the MOV actuator assembly housing 4. As shown in FIGS. 4 and 5, the flange 8 of the electric motor housing 3, instead of being attached directly to the MOV actuator housing 4, is bolted to a torque sensor ring 21 that forms one face of the motor power measuring cell 2, of this invention. A drive shaft adaptor 15 is secured to the end of electric motor drive shaft 9 by a set screw 16 or a key. A portion of the exterior of the drive shaft adaptor 15 is rotatably supported by a bearing assembly 17 secured within an actuator face plate 22 of the motor power measuring cell 2 by a bearing retainer plate 18 and a shaft collar 23 having internal threads which screw onto an externally threaded portion of the drive shaft adaptor 15. A pinion gear 19 is secured to the end of the drive shaft adaptor 15 and engages a mating wormshaft gear 20 secured to the drive end of a wormshaft 12 rotatably supported by the bearing assembly 13 and connected to the worm and worm gear (not shown) contained within the valve actuator housing 4.

As best illustrated in FIGS. 4 and 5, the motor power measuring cell 2 of this invention is comprised of the torque sensor ring 21 that forms the motor face of the motor power measuring cell 2 and an actuator face plate 22 bolted to the actuator housing 4. The torque sensor ring 21 is comprised of an outer ring portion 24 bolted, along with a flat shield plate 25, to the flange 8 of the electric motor housing 3, and an inner ring portion 26 bolted to the inside of the actuator face plate 22. As noted above, the actuator face plate 22 is in turn bolted to the actuator housing 4. The outer ring portion 24 of the torque sensor ring 21 is connected to the inner ring portion 26 by a plurality of flexure members, such as several thin radial web members 27, provided with sensors 28 capable of measuring torque between the outer ring portion 24 and the inner ring portion 26 of the torque sensor ring 21. While in this embodiment, the flexure members are several thin radial web members, other flexure members, such as a tube-like connector, having areas or portions removed or thinned to flex and increase or focus the localized strains occuring between the outer ring portion 24 and the inner ring portion 26 of the torque sensor ring 21, and provided with sensors 28 and could be used instead of the thin radial web members 27, if desired.

The torque sensor ring 21 and the actuator face plate 22 of the motor power measuring cell 2 are preferably machined from steel and are provided with securing bolt hole patterns to permit them to be bolted together and respectively to the flange 8 of the electric motor housing 3 and to the side of the valve actuator housing 4 of a commercial MOV. Different models of MOVs may require slightly different sizes and arrangement of the securing bolt hole patterns.

The motor power measuring cell 2, by having separate portions bolted to the flange 8 of the electric motor housing 3 and to the valve actuator housing 4, separates these two portions of the MOV 1 and supports the full weight of the electric motor and the electric motor housing 3. The torque sensor ring 21 of the motor power measuring cell 2 also carries the total reactive torque generated between the electric motor drive shaft 9 and the valve actuator assembly during operation of the MOV assembly 1.

Figure 6:
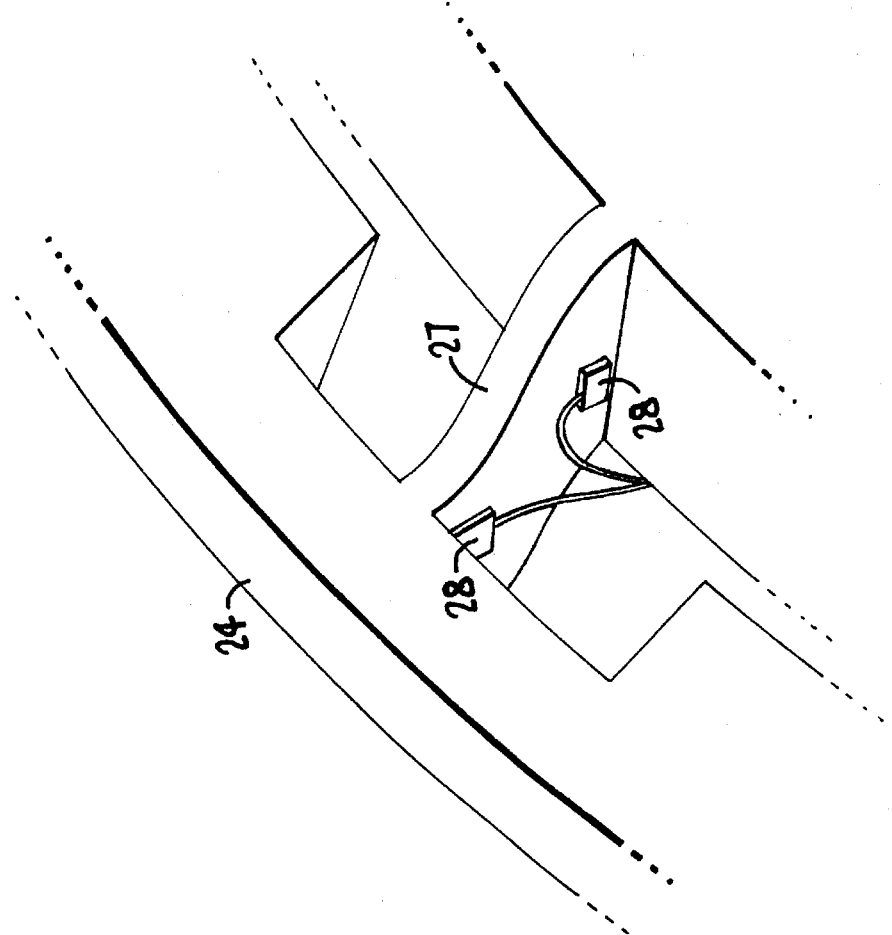
Figure 5A:
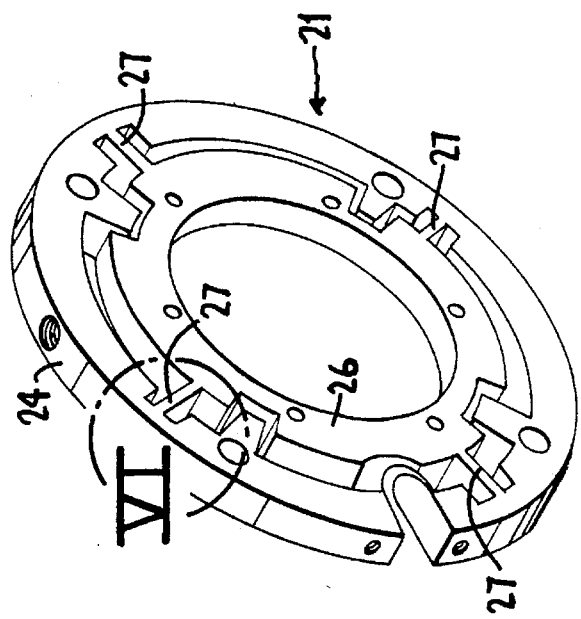
FIG. 5a is an enlarged isometric view of the torque sensor ring used to measure reactive torque in the motor power cell of this invention.

The torque sensor ring 21 is provided with sensors 28 that can continuously measure and monitor the total torque between the outer ring portion 24 and the inner ring portion 26. In the preferred embodiment of this invention, as illustrated in FIGS. 5a and 6, the sensors 28 are preferably electrical resistance strain gages bonded to both ends and sides along the centerline of one or more of the thin radial web members 27 and connected to each other in a wheatstone bridge configuration to continuously measure the relative compression and tension strains on both sides and ends of the thin radial web member 27. This embodiment used constanan foil strain gages with a gage factor of two, manufactured by MicroMeasurements Group, with good results. The strain gage sensors 28 are electrically connected to a recording ohmmeter (not shown) by wires 29 leading out of the motor power cell 2. The strains measured by the strain gage sensors 28 can be calibrated to provide the amount of total torque acting on the torque sensor ring 21 and in turn the motor drive shaft 9, in foot pounds or other units, by applying suitable incremental twisting moments to the motor power measuring cell 2 in a test stand before its installation in an operating MOV.

The drive shaft adaptor 15 in this embodiment is also provided with rotary index mark or marks 30 for use with a conventional tachometer or optical speed encoder 31 that is able to sight the rotary index mark or marks 30 through a port 32 in the side of the motor power measuring cell 2 to provide a continuous measurement and monitoring of the rotational speed of the motor drive shaft 9. This embodiment used a rotary optical speed encoder quadrature output assembly of the type manufactured by Teledyne Gurley or Dynapar Corporation with good results. Other types of commercially available, contact or non-contact, rotational speed sensors or tachometers could also be used, if desired.

As a result of the use of the apparatus of this invention, one is able to easily and inexpensively equip most existing AC and DC motor operated valves to provide for direct and continuous measuring and remote monitoring of the actual mechanical power produced by an electric motor and the rotational speed and reactive torque acting on the drive shaft of the electric motor while it is being used to operate and control a motor operated valve.

The apparatus of this invention is also able to calibrate or correlate the mechanical power or torque produced by the electric motor to the electrical power for the purpose of monitoring trends and functionality checks on a MOV from a remote location.

The apparatus of this invention is also useful for measuring the actual throughput efficiency of a motor operator, in combination with other equipment that measures the actuator output torque or thrust. These measurements are useful in determining the amount of valve load at which the motor will stall, based on the stall torque of the motor. Measurements by the apparatus of this invention are more reliable than the motor efficiency data provided by the motor manufacturer, as a result of variations in the lubricant and other conditions in the gearbox connecting the motor to the valve actuator.

While I have described this invention by illustrating and describing the preferred embodiment of it, I have done this by way of example and am not to be limited thereby, as there could be adaptations and variations of this embodiment that could be made within the scope of this invention.

I claim:

1. Apparatus for measuring the torque acting on and the rotational speed of a drive shaft of an electric motor attached to a valve actuator comprising a motor power measuring cell positioned between and secured to the electric motor and the valve actuator, the motor power measuring cell being provided with a first measuring means for measuring the torque acting on the drive shaft and a second measuring means for measuring the rotational speed of the drive shaft.

2. The apparatus of claim 1 in which the motor power measuring cell is bolted to a housing for the electric motor and to a housing for the valve actuator.

3. The apparatus of claim 1 in which the first measuring means is a plurality of electrical resistance strain gages.

4. The apparatus of claim 1 in which the second measuring means is an optical speed encoder.

5. The apparatus of claim 1 in which the motor power cell is comprised of a torque sensor ring bolted to a housing for the electric motor and an actuator face plate bolted to a housing for the valve actuator.

6. The apparatus of claim 5 in which the torque sensor ring is comprised of an outer ring portion and an inner ring portion connected by a plurality of thin radial web members.

7. The apparatus of claim 6 in which the inner ring portion is bolted to the actuator face plate.

8. The apparatus of claim 6 in which at least one of the thin radial web members is provided with a plurality of electrical resistance strain gages.

9. The apparatus of claim 8 in which the electrical resistance strain gages are connected in a wheatstone bridge configuration.

10. The apparatus of claim 5 in which the torque sensor ring is comprised of two concentric rings joined by a plurality of flexure members.

11. The apparatus of claim 10 in which at least one of the flexure members is provided with a plurality of electrical resistance strain gages.

12. The apparatus of claim 11 in which the electrical resistance strain gages are connected in a wheatstone bridge configuration.

13. A motor operated valve having a valve body containing a valve element, a valve stem connected to said valve element, an actuator connected to said valve stem, and a motor connected to said actuator, said motor operable to provide power to said actuator through a drive shaft, wherein the improvement comprises a motor power measuring device connected between said motor and said actuator, said motor power measuring device being operable to measure the torque acting on said drive shaft, and wherein said motor power measuring device further comprises a means for measuring the rotational speed of said drive shaft.

14. The valve of claim 13, wherein said means for measuring the rotational speed of said drive shaft further comprises an optical encoder.

15. A motor operated valve comprising:

a valve body containing a valve element;

a valve stem connected to said valve element;

an actuator connected to said valve stem;

a motor connected to said actuator and operable to provide power to said actuator through a drive shaft;

a torque measuring device connected to said motor and operable to measure the torque acting on said drive shaft; and a means for measuring the rotational speed of said drive shaft.

* * * * *